US008855870B2

(12) United States Patent
Hyodo et al.

(10) Patent No.: US 8,855,870 B2

(45) Date of Patent: Oct. 7, 2014

(54) CLUTCH CONTROL DEVICE FOR INDUSTRIAL VEHICLE

(75) Inventors: Koji Hyodo, Kasumigaura (JP); Takashi Takeyama, Ryugasaki (JP); Akira Shimohira, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 77 days.

(21) Appl. No.: 13/516,021

(22) PCT Filed: Dec. 14, 2010

(86) PCT No.: PCT/JP2010/072497

§ 371 (c)(1), (2), (4) Date: Jun. 14, 2012

(87) PCT Pub. No.: WO2011/074582

PCT Pub. Date: Jun. 23, 2011

(65) Prior Publication Data

US 2012/0296530 A1 Nov. 22, 2012

(30) Foreign Application Priority Data

Dec. 14, 2009 (JP) ................................ 2009-283138

(51) Int. Cl.

| | |
|---|---|
| ***G06F 7/00*** | (2006.01) |
| ***E02F 9/20*** | (2006.01) |
| ***F16D 48/06*** | (2006.01) |
| ***E02F 9/22*** | (2006.01) |

(52) U.S. Cl.

CPC .......... *F16D 48/06* (2013.01); *F16D 2500/508* (2013.01); *E02F 9/2079* (2013.01); *F16D 2500/1112* (2013.01); *F16D 2500/70424* (2013.01); *E02F 9/2253* (2013.01); *F16D 2500/10412* (2013.01); *F16D 2500/31426* (2013.01); *F16D 2500/3108* (2013.01); *B60Y 2200/415* (2013.01); *E02F 9/202* (2013.01)

USPC ............................................... 701/50; 701/67

(58) Field of Classification Search

CPC .. B60Y 2200/415; E02F 9/202; E02F 9/2045; E02F 9/2079; E02F 9/2253; F16D 48/06; F16D 2500/10412; F16D 2500/1112; F16D 2500/3108; F16D 2500/31426; F16D 2500/508; F16D 2500/70424

USPC ......... 180/278, 292–295, 305–307, 356–385; 188/71.2, 199, 291; 701/50, 67

See application file for complete search history.

(56) References Cited

U.S. PATENT DOCUMENTS 2,596,053 A * 5/1952 Stueland ....................... 180/292
5,588,515 A * 12/1996 Toyama et al. ............... 192/222

(Continued)

FOREIGN PATENT DOCUMENTS

JP 6-72188 A 3/1994
JP 2001-263384 A 9/2001
JP 2005-299732 A 10/2005

OTHER PUBLICATIONS

International Search Report dated Jan. 25, 2011 (one (1) page).

*Primary Examiner* — Mary Cheung
*Assistant Examiner* — Atul Trivedi
(74) *Attorney, Agent, or Firm* — Crowell & Moring LLP

(57) ABSTRACT

A clutch control device for an industrial vehicle includes: a braking force detection device that detects braking force of the industrial vehicle; a speed stage detection device that detects a set speed stage of a transmission; a clutch control device that controls engage/release of a forward clutch so that the forward clutch is released when a clutch cut off condition is judged to be satisfied based upon braking force of the industrial vehicle detected by the braking force detection device; and a switching device that automatically switches the clutch cut off condition in the clutch control device based upon a set speed stage of the transmission detected by the speed stage detection device.

7 Claims, 8 Drawing Sheets

(56) References Cited

U.S. PATENT DOCUMENTS

2002/0107111 A1* 8/2002 Murakami .................... 477/210
2004/0040775 A1* 3/2004 Shimizu et al. ............... 180/337
2004/0138024 A1* 7/2004 Kano et al. ...................... 477/74
2006/0027413 A1* 2/2006 Tabata et al. .................. 180/305
2006/0054377 A1* 3/2006 Izukura et al. ................ 180/307
2006/0289223 A1* 12/2006 Dolger et al. ................ 180/305
2007/0084450 A1* 4/2007 Oka et al. ...................... 123/675
2008/0146398 A1* 6/2008 Vornehm et al. .............. 475/210
2008/0262682 A1* 10/2008 Bergsten ......................... 701/50
2009/0076694 A1* 3/2009 Tabata et al. .................... 701/58
2009/0120710 A1* 5/2009 Hasegawa et al. ............ 180/365
2009/0187318 A1* 7/2009 Lin et al. ......................... 701/67
2009/0248258 A1* 10/2009 Fukumoto ....................... 701/50
2009/0248265 A1* 10/2009 Tabata et al. .................... 701/59
2010/0071987 A1* 3/2010 Hyodo et al. ................. 180/338
2010/0076652 A1* 3/2010 Hyodo et al. ................... 701/50

* cited by examiner

CLUTCH CONTROL DEVICE FOR INDUSTRIAL VEHICLE

TECHNICAL FIELD

The present invention relates to a clutch control device for a industrial vehicle.

BACKGROUND ART

In an industrial vehicle such as a wheel loader, when loading soil or the like onto a dump truck, for example, an engine rotation speed is maintained at high by depressing the accelerator pedal, while the vehicle is decelerated by applying brake as approaching the dump truck, so as to uplift a working device (bucket). Accordingly, there is a clutch cut off device known in the related art that releases a forward/reverse clutch so as to block drive force from transmitting (refer to the patent literature 1), when, for example, the brake fluid pressure, that is detected for knowing an operation state of brake, exceeds a predetermined value.

CITATION LIST

Patent Literature

PATENT LITERATURE 1 Japanese Laid Open Patent Publication No. 2001-263384

SUMMARY OF INVENTION

Technical Problem

However, since the clutch cut off device described above judges release timing of a forward/reverse clutch only with an operation state of the brake, the release timing of the forward/reverse clutch is occasionally not optimal depending upon an operating condition of the industrial vehicle and upon the degree of sloping of the road surface.

Solution to Problem

A clutch control device for an industrial vehicle according to a first aspect of the present invention comprises: a braking force detection device that detects braking force of the industrial vehicle; a speed stage detection device that detects a set speed stage of a transmission; a clutch control device that controls engage/release of a forward clutch so that the forward clutch is released when a clutch cut off condition is judged to be satisfied based upon braking force of the industrial vehicle detected by the braking force detection device; and a switching device that automatically switches the clutch cut off condition in the clutch control device based upon a set speed stage of the transmission detected by the speed stage detection device.

According to a second aspect of the present invention, in the clutch control device for industrial vehicle according to the first aspect, it is preferable that the transmission has a plurality of speed stages; and when the speed stage detection device detects that the transmission has been set to a low speed stage, the switching device automatically switches the clutch cut off condition.

According to a third aspect of the present invention, in the clutch control device for industrial vehicle according to the second aspect, it is preferable to further comprise a timing selection device that can select release timing of the forward clutch at least between a first stage, in which the forward clutch is released at an earlier timing, and a second stage, in which the forward clutch is released at a later timing, wherein: the switching device automatically switches the clutch cut off condition so that, when the first stage has been selected by the timing selection device, if the transmission is detected to have been set to the low speed stage, timing at which the forward clutch is released becomes later.

According to a fourth aspect of the present invention, in the clutch control device for industrial vehicle according to the first to third aspects, the clutch control device may judge that the clutch cut off condition is satisfied when the braking force is equal to or greater than a clutch cut off threshold value.

A wheel loader according to a fifth aspect of the present invention includes a clutch control device for industrial vehicle according to the first to fourth aspects.

Advantageous Effect of the Invention

According to the present invention, the timing of clutch cut off can be automatically set to an optimal timing corresponding to various conditions.

DESCRIPTION OF EMBODIMENTS

Figure 1:
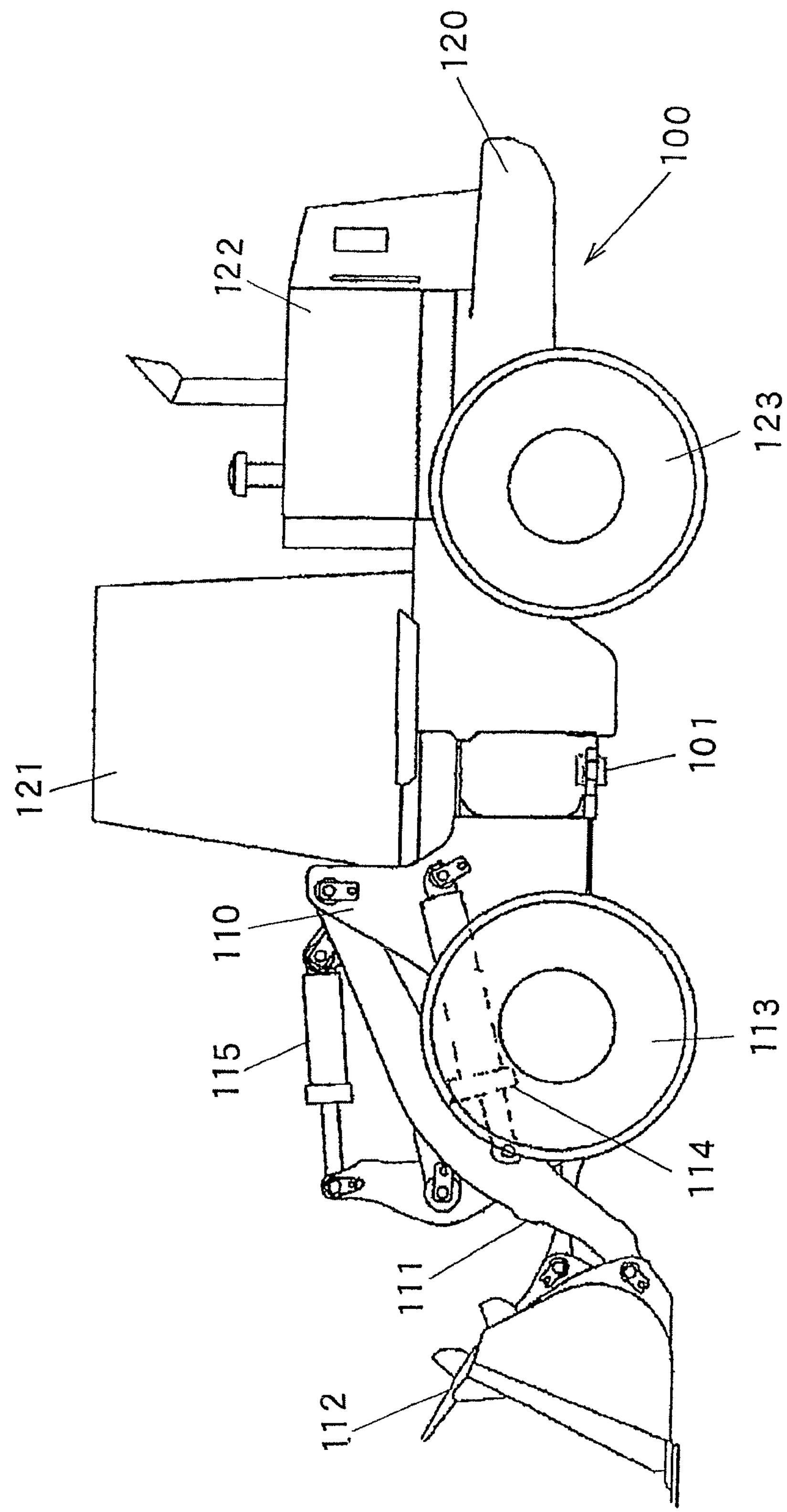
FIG. 1 A side view of a wheel loader that is an example of a industrial vehicle according to an embodiment of the present invention.

An embodiment of a clutch control device for an industrial vehicle according to the present invention will now be explained with reference to FIGS. 1 to 8. FIG. 1 is a side view of a wheel loader that is an example of a industrial vehicle to which the clutch control device according to the embodiment is applied. A wheel loader 100 is constituted with a front body 110 that includes an arm 111, a bucket 112 as a working machine device, tires 113, and the like and a rear body 120 that includes a driver cabin 121, an engine bay 122, tires 123, and the like. The arm 111 performs a turning (lifting) motion in vertical direction by actuating the arm cylinder 114, and the bucket 112 performs tilting motion in vertical direction (for dumping or crowding) by actuating the bucket cylinder 115. The front body 110 and the rear body 120 are rotatably articulated with each other by a center pin 101 and the front body 110 turns right and left with respect to the rear body 120 by extension or retraction of a steering cylinder (not shown).

Figure 2:
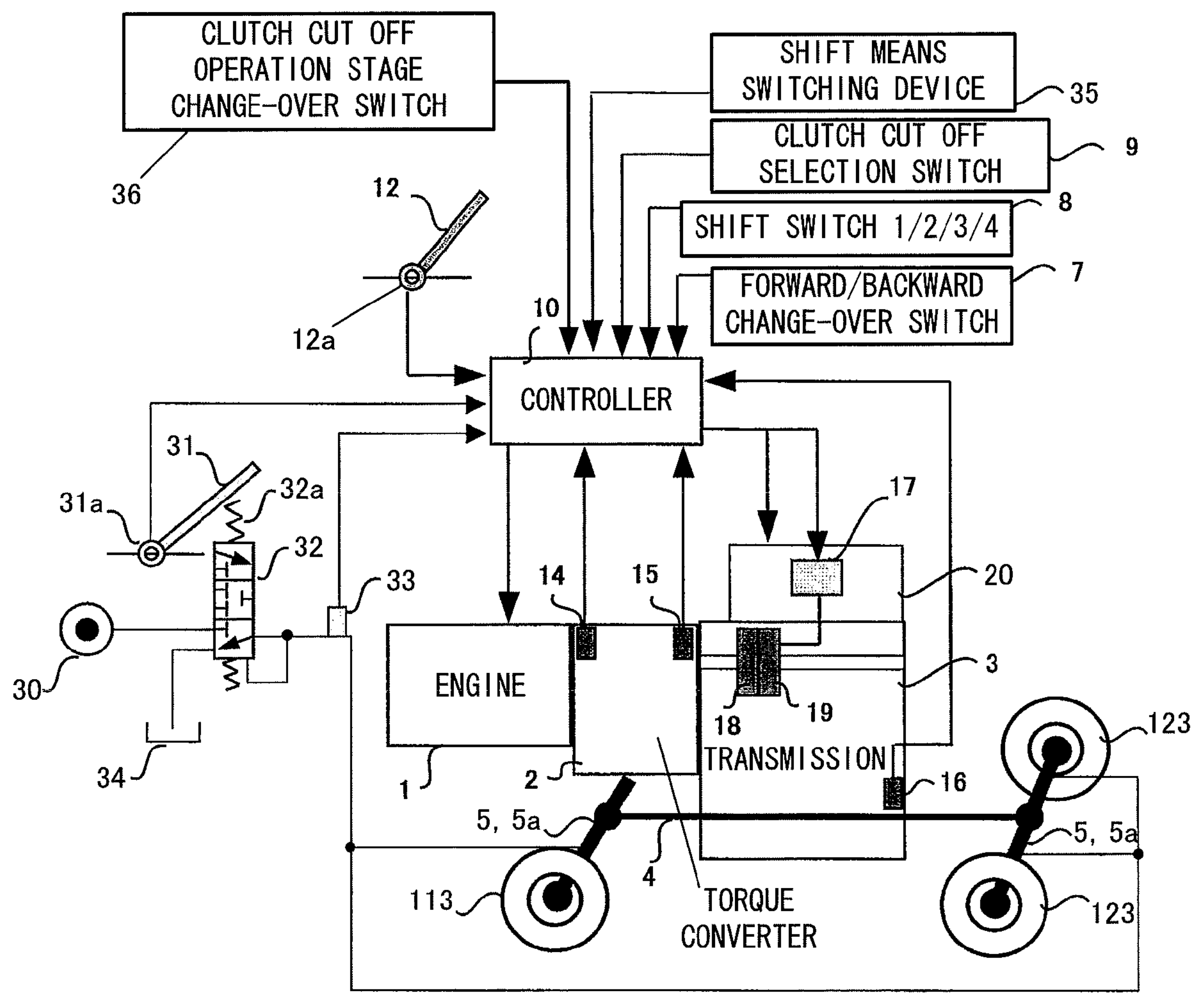
FIG. 2 A diagram that shows a block diagram for a structure of a wheel loader.

FIG. 2 shows a block diagram for a structure of the wheel loader 100. An input shaft 21 of a torque converter 2 (refer to FIG. 3) is coupled to an output shaft of an engine 1, and an output shaft 22 of the torque converter 2 (refer to FIG. 3) is coupled to a transmission 3. The torque converter 2 is a fluid clutch that is constituted with a well known impeller, a turbine, and a stator, and rotation of the engine 1 is transmitted to the transmission 3 through the torque converter 2. The transmission 3 includes a hydraulic clutch that shifts the speed stage between the first speed and the fourth speed, and rotation speed of the output shaft of the torque converter 2 is changed via the transmission 3. Rotation after the speed shift is transmitted to the tires 113 and 123 through a propeller shaft 4 and an axle 5, and thus the wheel loader travels.

The axle 5 is provided with a brake unit 5*a* for decelerating and stopping the wheel loader 100. Upon supply of brake fluid (hydraulic operating fluid) via a brake valve 32, the brake unit 5*a* generates braking force in accordance with pressure of the hydraulic operating fluid. The brake valve 32 is a pressure reducing valve that reduces pressure of pressure oil supplied from a hydraulic source 30 of hydraulic operating fluid to a pressure in accordance with compression force of a spring 32*a*. When an operator depresses a brake pedal 31 provided in the driver cabin 121, the spring 32*a* is compressed in accordance with the depression force on the brake pedal 31. Thus, the brake valve 32 reduces a pressure of pressure oil supplied from the hydraulic source 30 of hydraulic operating fluid to the pressure corresponding to a depression force on the brake pedal 31. As compression force of the spring 32*a* (that is, depression force on the brake pedal 31) increases, the brake valve 32 reduces pressure of hydraulic operating fluid so as to supply high-pressure hydraulic operating fluid to the brake unit 5*a*. A reference numeral 34 represents a hydraulic operating fluid reservoir.

It is to be noted that a working hydraulic pump not shown is driven by the engine 1, and the discharged oil from the hydraulic pump is led to a working actuator (for instance, the arm cylinder 114) via a directional control valve (not shown). The directional control valve is driven by operating an operating lever (not shown) and is operable to drive the actuator corresponding to the operation amount of the operating lever.

The torque converter 2 has a function to increase output torque with respect to input torque, i.e., a function to make a torque ratio 1 or greater. The torque ratio decreases with an increase in a torque converter speed ratio e (=Nt/Ni), which is a ratio of a rotation number Nt of the output shaft 22 to a rotation number Ni of the input shaft 21 of the torque converter 2. For example, if travel load increases during travel at a constant engine rotation number, the rotation number of the output shaft 22 of the torque converter 2 decreases, i.e., the vehicle speed decreases and the torque converter speed ratio e becomes small. Since, at the same time, the torque ratio increases, the vehicle can travel with a greater driving force for travelling (i.e. traction force).

Figure 3:
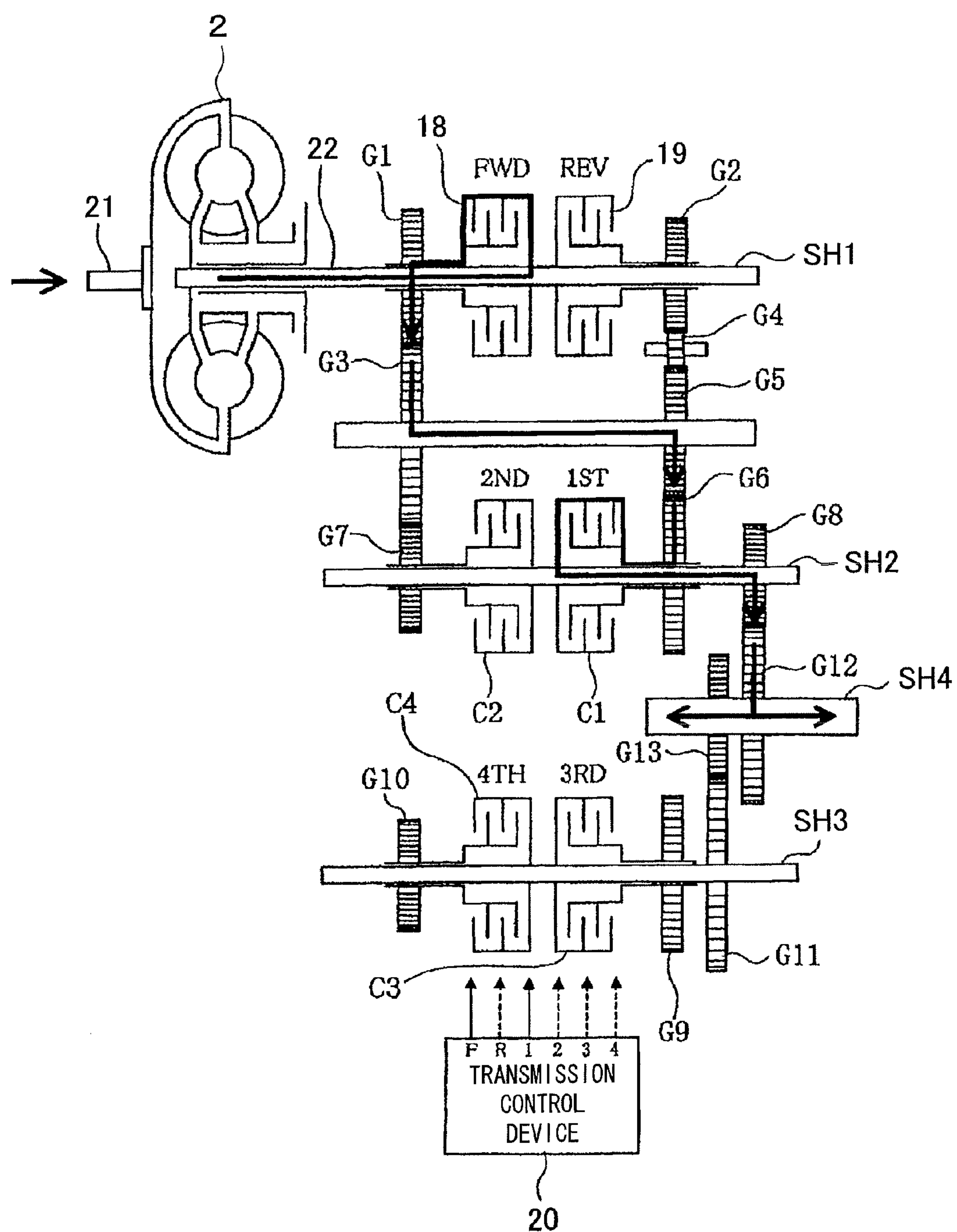
FIG. 3 A diagram that shows a simplified structure of a transmission.

The structure of the transmission 3 will now be explained. FIG. 3 shows a simplified diagram for a structure of the transmission 3. The transmission 3 includes a plurality of clutch shafts SH1 to SH3, an output shaft SH4, a plurality of gears G1 to G13, a forward hydraulic clutch (forward clutch) 18, a reverse hydraulic clutch (reverse clutch) 19, and hydraulic clutches C1 to C4 for the first speed to the fourth speed, respectively. The hydraulic clutches 18, 19, and C1 to C4 are each engaged or released by pressure oil (clutch pressure) supplied via a transmission control device 20. Namely, the clutches 18, 19, and C1 to C4 are engaged when the clutch pressure supplied to the hydraulic clutches 18, 19, and C1 to C4 increases and the clutches 18, 19, and C1 to C4 are released when the clutch pressure decreases.

The output shaft 22 of the torque converter 2 is coupled to the clutch shaft SH1, and both end portions of the output shaft SH4 are coupled to the axles 5 at the front and the rear of the vehicle through the propeller shaft 4 of FIG. 2. In FIG. 3, the forward clutch 18 and the first speed clutch C1 are in an engaged state and the other clutches, i.e., the clutches 19, and C2 to C4 are in a released state. In this case, the gear G1 and the clutch shaft SH1 rotate integrally and the gear G6 and the clutch shaft SH2 rotate integrally.

At this time, output torque of the engine 1 is transmitted to the output shaft SH4 through the input shaft 21 and the output shaft 22 of the torque converter 2, the clutch shaft SH1, the forward clutch 18, the gears G1, G3, G5, and G6, the first speed clutch C1, the clutch shaft SH2, and the gears G8 and G12 as indicated by the thick line in FIG. 3. This enables travelling at the first speed.

When changing from the first speed to the second speed, the first speed clutch C1 is released by clutch pressure supplied via the transmission control device 20, and the second speed clutch C2 is engaged. Due to this, output torque of the engine 1 is transmitted to the output shaft SH4 through the input shaft 21 and the output shaft 22 of the torque converter 2, the clutch shaft SH1, the forward clutch 18, the gears G1, G3, and G7, the second speed clutch C2, the clutch shaft SH2, and the gears G8 and G12, which enables travelling at the second speed. Speed-changes other than that from the first speed to the second speed, i.e., those from the second speed to the third speed, from the third speed to the fourth speed, from the fourth speed to the third speed, that from the third speed to the second speed, and from the second speed to the first speed are also performed by controlling the clutches C1 to C4 similarly.

There are two types of automatic transmission control, i.e., the torque converter speed ratio reference control, which is to shift gears when the torque converter speed ratio e reaches a predetermined value, and the vehicle speed reference control, which is to shift gears when the vehicle speed reaches a predetermined value. In the present embodiment, the speed stage of the transmission 3 is controlled by the torque converter speed ratio reference control.

Figure 4:
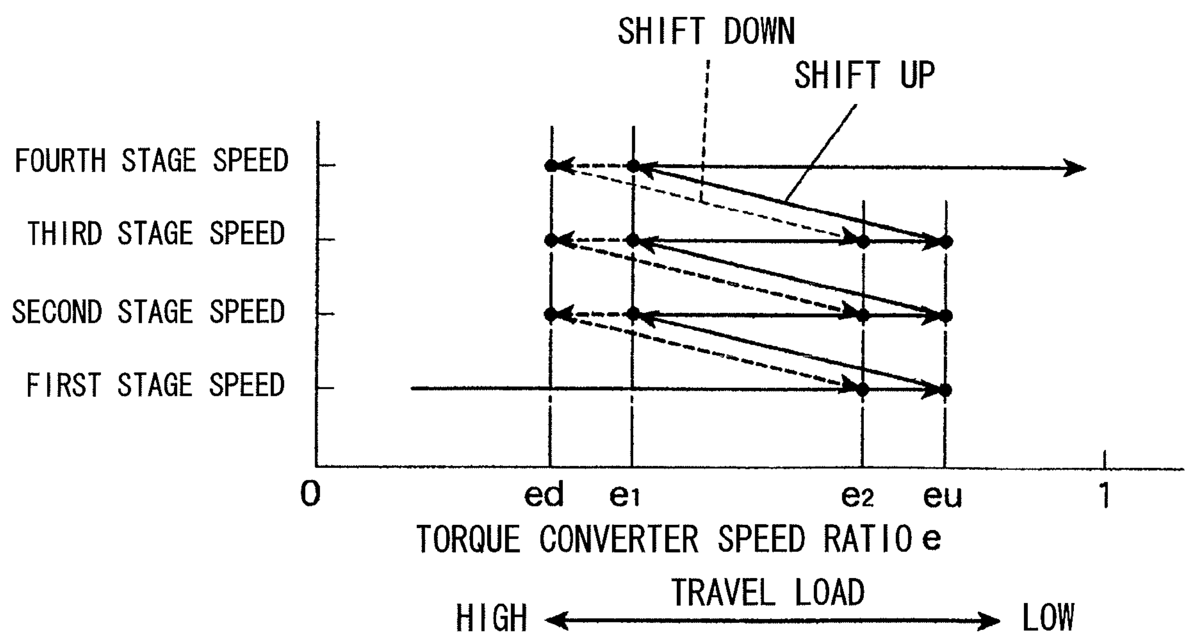
FIG. 4 A chart that shows a relationship between torque converter speed ratio and speed stage.

FIG. 4 is a chart that shows a relationship between the torque converter speed ratio e and speed stage. When the travel load becomes low and the torque converter speed ratio e increases to become equal to or greater than a predetermined value eu, the speed stage is shifted up by one stage. As a result, the torque converter speed ratio e becomes e1 ($ed<e1<eu$). On the contrary, when the travel load becomes high and the torque converter speed ratio e decreases to become equal to or less than a predetermined value ed, the speed stage is shifted down by one stage. As a result, the torque converter speed ratio e becomes e2 ($ed<e2<eu$). The predetermined values eu and ed are set in a controller 10 in advance. The controller 10 detects the currently set speed stage of the transmission 3.

The controller 10 shown in FIG. 2 is configured to include an arithmetic processing unit that includes a CPU, a ROM, a RAM, other peripheral circuits, and the like. The controller 10 is connected with a pedal operation amount detector 12*a* that detects an operation amount of an accelerator pedal 12, a rotation number detector 14 that detects the rotation number Ni of the input shaft 21 of the torque converter 2, a rotation number detector 15 that detects the rotation number Nt of the output shaft 22 of the torque converter 2, and a vehicle speed detector 16 that detects a rotation speed of the output shaft of the transmission 3, i.e., a vehicle speed v. The controller 10 is connected with a forward/backward change-over switch 7 that instructs forward/backward traveling of the vehicle, a shift switch 8 that instructs the maximum speed stage between the first speed and the fourth speed, and a clutch cut off selection switch 9 that selects whether or not to perform clutch cut off (described later). In addition, the controller 10 is connected with a shift means switching device 35 that switches whether shifting at the transmission 3 is performed automatically or manually and a clutch cut off operation stage change-over switch 36 that switches a condition based upon which the forward/reverse clutches 18 and 19 are cut off as described later.

The controller 10 is connected with a pedal operation amount detector 31*a* that detects an operation amount at the brake pedal 31 and a pressure sensor 33 that detects pressure of hydraulic operating fluid to be supplied to the brake unit 5*a*. The controller 10 controls the rotation speed (rotation number) of the engine 1, corresponding to the operation amount at the accelerator pedal 12 detected by the pedal operation amount detector 12*a*.

For instance, when the wheel loader 100 performs a work to load soil or the like onto a dump truck, though the operator depresses the brake pedal 31 to decelerate the wheel loader 100 when approaching the dump truck, and also depresses the accelerator pedal 12 to uplift the bucket 112, therefore the rotation number of the engine 1 is maintained at high. When the clutch cut off selection switch 9 is selected so as to operate clutch cut off, if a decision is made that a clutch cut off condition described later is satisfied, the controller 10 outputs to the transmission control device 20 a control signal (cut off signal) for releasing (cutting off) the forward/reverse clutches 18 and 19. In the transmission control device 20, upon receiving the cut off signal, a clutch cut off valve 17 (FIG. 2) provided in the transmission control device 20 reduces clutch pressure at the clutches 18 and 19. As a result, the clutches 18 and 19 are released and transmission of travel drive force (hereinafter simply referred to as drive force) is blocked.

As described above, releasing the clutches 18 and 19 when it is judged that the vehicle has approached an object that is to be approached (hereinafter referred to as an approaching object) for a work of loading soil or the like is referred to as clutch cut off. It is to be noted that when the clutch cut off selection switch 9 is selected to disable clutch cut off, the controller 10 does not output a cut off signal even if the clutch cut off condition is satisfied. Thus, when the clutch cut off selection switch 9 is selected to disable the clutch cut off, the clutch cut off described above is not performed.

Figure 5:
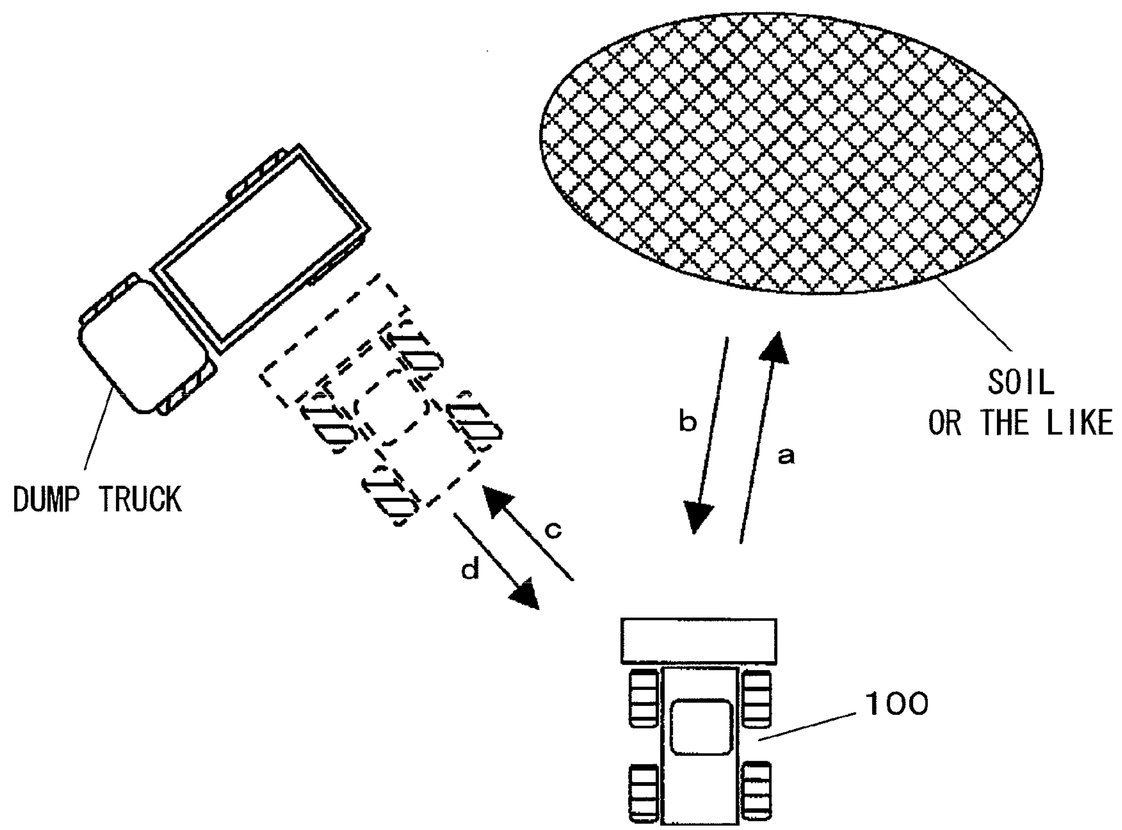
FIG. 5 An illustration that shows V-shape loading.

FIG. 5 is an illustration that shows V-shape loading, which is one of the methods to load soil or the like onto a dump truck. In the V-shape loading, firstly, as indicated by an arrow a, the wheel loader 100 moves forward and scoop soil or the like, and after that, as indicated by an arrow b, the wheel loader 100 moves backward shortly. Then, as indicated by an arrow c, the wheel loader 100 moves forward to the dump truck and load the scooped soil or the like onto the dump truck, and as indicated by an arrow d, the wheel loader 100 moves backward to the original position.

Loading soil or the like onto the dump truck indicated by the arrow c of FIG. 5 does not require a great drive force unlike an excavation work does. Therefore, the operator sets the maximum speed stage into the second speed using the shift switch 8 or, after switching the shifting at the transmission 3 into manual shifting using the shift means switching device 35, sets so that the speed stage is fixed to the second speed.

Figure 6:
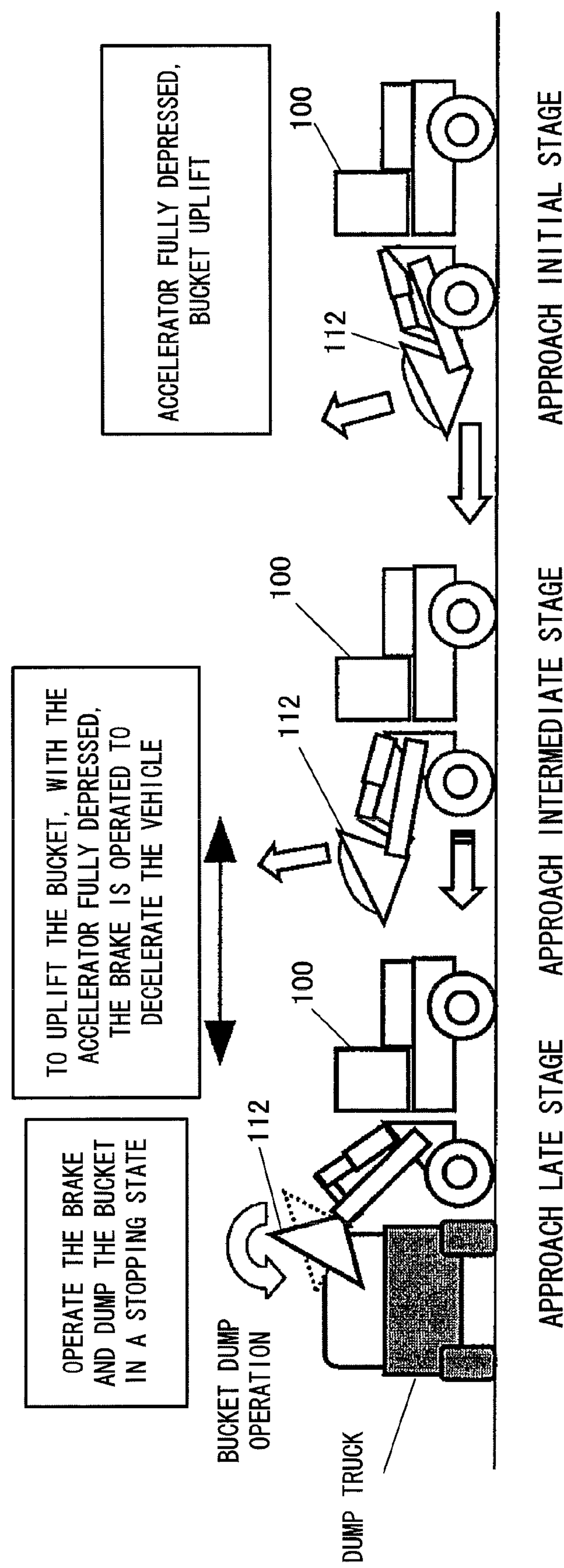
FIG. 6 An illustration that shows positions of a wheel loader when loading soil or the like onto a dump truck.

FIG. 6 is an illustration that shows a state of the wheel loader 100 when loading soil or the like onto a dump truck, indicated by the arrow c of FIG. 5. For the sake of convenience in explanation, an initial step for approaching an approaching object, a dump truck, in which the wheel loader 100 is accelerated, is referred to as an early phase of approaching. An intermediate phase to approach the dump truck, the step in which the wheel loader 100 is started to decelerate until it is stopped is referred to as an intermediate phase of approaching. The step in which the wheel loader 100, in its stopped state, completes loading the soil or the like in the bucket 112 onto the dump truck is referred to as a late phase of approaching.

As shown in FIG. 6, in the early phase of approaching, the accelerator pedal 12 is fully depressed for accelerating the wheel loader 100 and uplifting the bucket 112. In the intermediate phase of approaching, the accelerator pedal 12 is fully depressed for uplifting the bucket 112, while at the same time the brake pedal 31 is also depressed gradually for decelerating the wheel loader 100. In the late phase of approaching, the brake pedal 31 is fully depressed for stopping the wheel loader 100. When the clutch cut off selection switch 9 is selected to perform clutch cut off, if the clutch cut off condition described later is satisfied by the operator's depressing of the brake pedal 31 or the like in the intermediate phase of approaching, the clutch cut off is performed as described above.

Hence, since transmission of drive force is blocked when approaching the dump truck, it is not necessary to decelerate and stop the wheel loader 100 against the drive force. As a result, compared to the case of decelerating and stopping of the wheel loader 100 without performing the clutch cut off and thus competing with the drive force, the load on the brake unit 5*a* can be reduced, and therefore temperature rise at the brake unit 5*a* is suppressed, and wear of various parts of the brake unit 5*a* can be suppressed. In addition, when the clutch cut off is operated, even if the wheel loader 100 is decelerated and stopped while the rotation number of the engine 1 is maintained high, the torque converter speed ratio e, which is a rotation number ratio between the input shaft 21 and the output shaft 22, is substantially 1, and input torque from the engine 1 to the torque converter 2 is very small. Hence, power loss at the torque converter 2 is reduced and fuel consumption can be reduced.

However, if timing of clutch cut off is not appropriate, the transmission of the drive force is suddenly blocked by the clutch cut off. Hence, the drive force of the wheel loader 100 is rapidly reduced and pitching of the wheel loader 100 may be induced. In a work of loading soil or the like, since the bucket 112 is at a high position, pitching tends to be greater. Due to this, when performing a work of loading soil or the like onto a dump truck using a traditional wheel loader, an operator who does not want pitching may select the clutch cut off selection switch 9 to disable clutch cut off, so that the clutch cut off described above is not performed. In this case, although the pitching described above may not be induced, wear of various parts of the brake unit 5*a* and an increase in power loss at the torque converter 2 will be caused.

Figure 7:
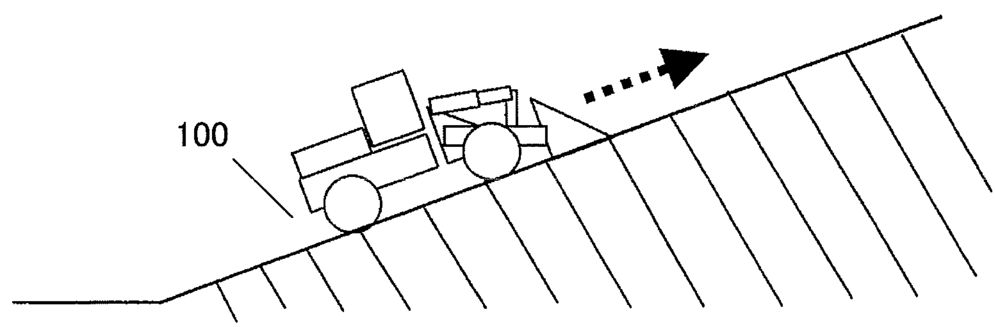
FIG. 7 An illustration that shows a position of a wheel loader when operating on a ramp.

On the other hand, as shown in FIG. 7, since a great drive force is generally required when the vehicle performs a work while going up a steep ramp (for example, the incline angle of approximately 20 degrees), the speed stage of the transmission 3 is set to the first speed, which is a low speed. On a steep ramp, own weight of the wheel loader 100 acts as travel load in a direction where the wheel loader 100 backs off (direction where it travels backward). Thus, clutch cut off is performed with the same condition as that in a level place, timing of clutch cut off is premature. When the timing of clutch cut off is premature, since travel drive force is blocked by the clutch cut off in a state where braking force is not sufficient, the wheel loader 100 starts moving down the ramp inversely. In this case, since the operator further depresses the brake pedal so as to stop the wheel loader 100, the wheel loader 100 stops suddenly and the pitching described above may be induced.

As explained above, it is preferable that in a work of loading soil or the like with uplift of the bucket 112 on a level place, clutch cut off is operated early and in a work in a steep ramp, clutch cut off is operated in retard. The clutch cut off operation stage change-over switch 36 described above is configured so that clutch cut off timing can be switched among early phase (first stage), late phase (second stage), and intermediate phase (third stage) by a manual operation made by the operator. For a work of loading soil or the like in a level place, the first step, at which clutch cut off is executed in early phase, is appropriate. On the other hand, for a work in a steep ramp, the second stage, at which clutch cut off is executed in late phase, is appropriate. However, it is difficult for the operator to make a decision as to which stage to select in accordance with the travel/work situation, and it is cumbersome that the operator is required to execute the clutch cut off operation stage change-over switch 36 every time the clutch cut off timing is changed.

Accordingly, the wheel loader 100 of the present embodiment is configured so that the operation timing of clutch cut off, i.e., a clutch cut off condition, is automatically switched as described below, so that the timing of clutch cut off becomes optimal in accordance with a variety of travel/work situations.

—Clutch Cut Off Control—

In the present embodiment, in order to achieve clutch cut off with optimal timing responsive to a variety of travel/work situations described above, the operation timing of clutch cut off is determined as follows.

(1) Clutch cut off is executed in early phase in a work of loading soil or the like including uplift of the bucket 112 in a level place, in which the work is performed in a state that the speed stage of the transmission 3 is set to the second speed.

(2) Clutch cut off is executed in late phase in a work in a steep ramp, in which the work is performed in a state that the speed stage of the transmission 3 is set to the first speed.

More specifically, the clutch cut off condition is automatically switched based upon the speed stage set in the transmission 3 and upon the information of a brake fluid pressure Plb detected by the pressure sensor 33.

The clutch cut off control will now be explained with reference to the flowchart of FIG. 8. In the processing shown in FIG. 8, the threshold value of the brake fluid pressure Plb is used as a clutch cut off condition.

Figure 8:
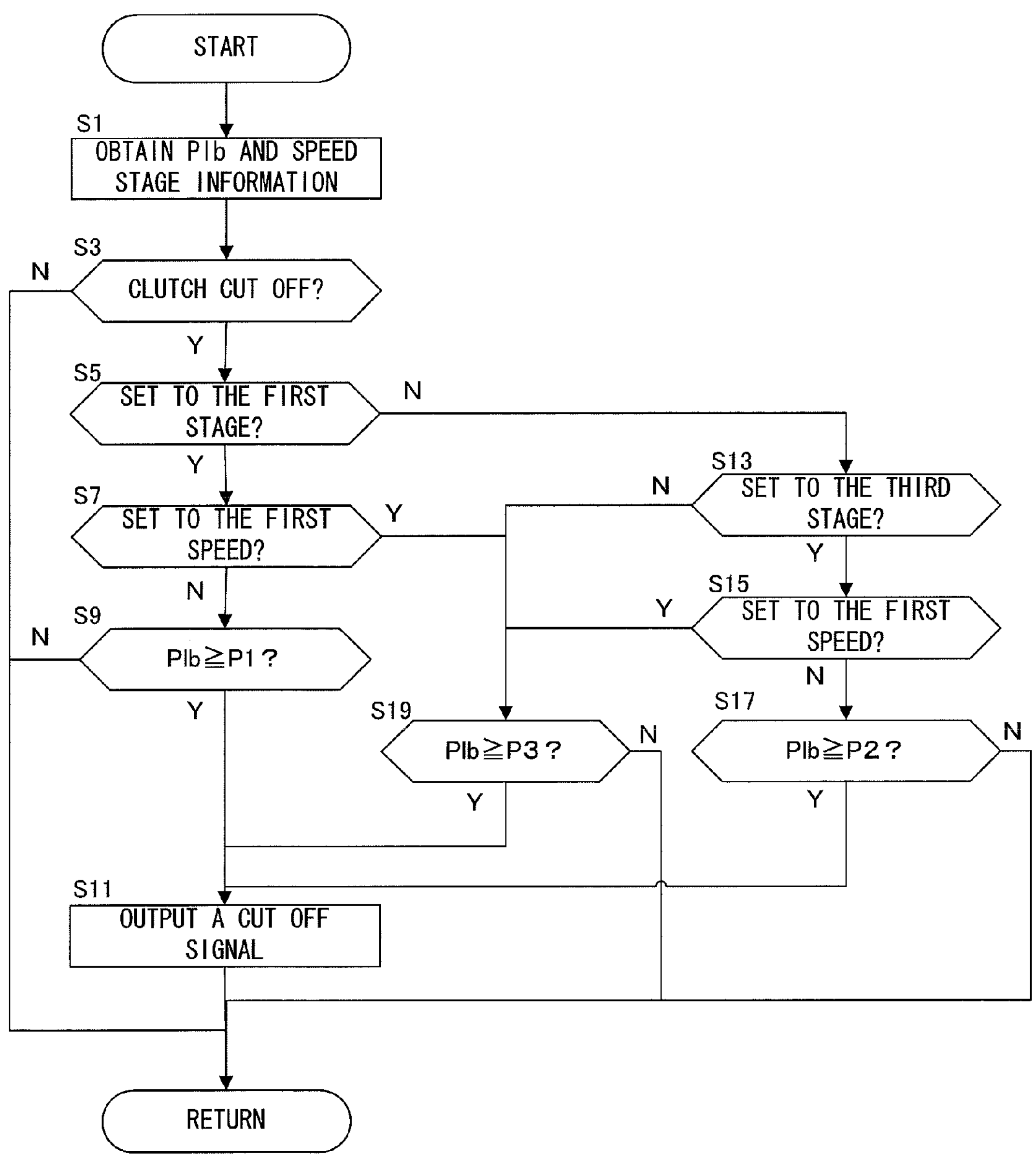
FIG. 8 A flowchart that shows the operation of clutch controlling process in the wheel loader according to an embodiment of the present invention.

FIG. 8 is a flowchart that shows the execution of clutch control processing executed in the wheel loader 100 according to an embodiment. When the ignition switch (not shown) of the wheel loader 100 is turned on, a program to perform the process shown in FIG. 8 is started and repeatedly executed by the controller 10. In step S1, the information of the brake fluid pressure Plb detected by the pressure sensor 33 and the information of a currently set speed stage of the transmission 3 are obtained, and the operation proceeds to step S3. In step S3, a judgment is made as to whether or not the clutch cut off selection switch 9 has been selected to perform clutch cut off.

If a positive judgment is made in step S3, i.e., if the clutch cut off selection switch 9 is judged to have been selected to perform clutch cut off, the operation proceeds to step S5 and a judgment is made as to whether or not the clutch cut off operation stage change-over switch 36 has been set to the first stage. If a positive judgment is made in step S5, i.e., if the clutch cut off operation stage change-over switch 36 is judged to have been set to the first stage, the operation proceeds to step S7 and a judgment is made as to whether or not the set speed stage of the transmission 3 is the first speed. If a negative judgment is made in step S5, i.e., if any of the second speed, the third speed, and the fourth speed is set, the operation proceeds to step S9.

In step S9, a judgment is made as to whether or not the brake fluid pressure Plb obtained in step S1 is equal to or greater than a first brake fluid pressure cut off threshold value P1. The first brake fluid pressure cut off threshold value P1 is set to a value with which clutch cut off can be executed at earlier timing in, for instance, a work of loading soil or the like in a level place. For example, the first brake fluid pressure cut off threshold value P1 is set to a value corresponding to the brake fluid pressure Plb that generates braking force to an extent such that the vehicle speed can be reduced against the travel drive force even if the accelerator pedal 12 is fully depressed when the vehicle approaches the approaching object (a dump truck) while the speed stage is set to the second speed. If a positive judgment is made in step S9 and the clutch cut off condition is judged to be satisfied, the operation proceeds to step S11 and a cut off signal described above is output to the transmission control device 20, and then the operation returns. As a result, in a work of loading soil or the like in a level place, for instance, clutch cut off can be executed at earlier timing when the brake fluid pressure Plb is low, i.e., when the braking force is low and the vehicle speed is high.

If a negative judgment is made in step S5, the operation proceeds to step S13 and a judgment is made as to whether or not the clutch cut off operation stage change-over switch 36 has been set to the third stage. If a positive judgment is made in step S13, i.e., if the clutch cut off operation stage change-over switch 36 is judged to have been set to the third stage, the operation proceeds to step S15 and a judgment is made as to whether or not the set speed stage of the transmission 3 is the first speed. If a negative judgment is made in step S15, i.e., if any of the second speed, the third speed, and the fourth speed has been set, the operation proceeds to step S17. In step S17, a judgment is made as to whether or not the brake fluid pressure Plb obtained in step S1 is equal to or greater than a second brake fluid pressure cut off threshold value P2.

The second brake fluid pressure cut off threshold value P2 is a value that is greater than the first brake fluid pressure cut off threshold value P1 and is set to a value with which clutch cut off can be operated at intermediate timing. If a positive judgment is made in step S17 and the clutch cut off condition is judged to be satisfied, the operation proceeds to step S11. As a result, clutch cut off can be operated at intermediate timing when the brake fluid pressure Plb is intermediate, i.e., when both the braking force and the vehicle speed are intermediate.

If a negative judgment is made in step S13, i.e., if the clutch cut off operation stage change-over switch 36 is judged to have not been set to the third stage, the operation proceeds to step S19 and a judgment is made as to whether or not the brake fluid pressure P1*b* obtained in step S1 is equal to or greater than a third brake fluid pressure cut off threshold value P3. The third brake fluid pressure cut off threshold value P3 is a value that is greater than the second brake fluid pressure cut off threshold value P2 and is set to a value with which clutch cut off can be executed with late timing. For example, the third brake fluid pressure cut off threshold value P3 is set to a value corresponding to the brake fluid pressure P1*b* that generates braking force to an extent such that even if the clutches 18 and 19 are released in a ramp with the inclination angle of approximately 20 degrees, the wheel loader 100 does not move down the ramp. If a positive judgment is made in step S19 and the clutch cut off condition is judged to be satisfied, the operation proceeds to step S11. As a result, for example, in a work in a ramp, clutch cut off can be executed with later timing when the brake fluid pressure P1*b* is high, i.e., when the braking force is high and the vehicle speed is low.

On the other hand, if a positive judgment is made in step S7, the operation proceeds to step S19. In other words, when the set speed stage of the transmission 3 is judged to be the first speed in a state where the clutch cut off operation stage change-over switch 36 is set to the first stage, a judgment is made in step S19 as to whether or not the brake fluid pressure Plb is equal to or greater than the third brake fluid pressure cut off threshold value P3. If a positive judgment is made in step S19 and the clutch cut off condition is judged to be satisfied, the operation proceeds to step S11. Thus, even if the clutch cut off operation stage change-over switch 36 has been set to the first stage, if the transmission 3 has been set to the first speed, the clutch cut off condition is automatically switched so as to delay the execution timing of clutch cut off. In other words, the brake fluid pressure cut off threshold value is automatically switched to a value with which the execution timing of clutch cut off is delayed.

In addition, if a positive judgment is made in step S15, the operation proceeds to step S19. More specifically, if the set speed stage of the transmission 3 is judged to be the first speed in a state where the clutch cut off operation stage change-over switch 36 is set to the third stage, a judgment is made in step S19 as to whether or not the brake fluid pressure Plb is equal to or greater than the third brake fluid pressure cut off threshold value P3. If a positive judgment is made in step S19 and the clutch cut off condition is judged to be satisfied, the operation proceeds to step S11. Thus, even if the clutch cut off operation stage change-over switch 36 has been set to the third stage, if the transmission 3 has been set to the first speed, the clutch cut off condition is automatically switched so as to delay the execution timing of clutch cut off. In other words, the brake fluid pressure cut off threshold value is automatically switched to a value with which the execution timing of clutch cut off is delayed.

If a negative judgment is made in steps S3, S9, S17, or S19, the operation returns.

Configuring the clutch cut off condition to be automatically switched as described above enables clutch cut off to be executed with optimal timing for the situation in each of a work of loading soil in a level place and a work in a ramp. In addition, the operability is good for the operator because he does not need to frequently perform an operation of switching the clutch cut off operation stage change-over switch 36.

The following advantageous effects can be achieved according to the embodiment described above.

(1) When a judgment is done that clutch cut off condition is satisfied based upon braking force of the wheel loader 100, the controller 10 executes clutch cut off by releasing the forward/reverse clutches 18 and 19. In addition, the controller 10 automatically switches the clutch cut off condition based upon the set speed stage of the transmission 3. As a result, the clutch cut off timing can be automatically changed to optimal timing in accordance with a variety of situations without a manual operation of the clutch cut off operation stage change-over switch 36 performed by the operator. In addition, since clutch cut off is executed with optimal timing in accordance with the travel/work situation, the wheel loader 100 moves smoothly.

(2) If the transmission 3, which has a plurality of speed stages, is detected to have been set to a low speed stage, the controller 10 automatically switches the clutch cut off condition. When the transmission 3 is set to a low speed stage, i.e., while the wheel loader 100 is performing a work in a steep ramp or the like that requires a great drive force, the clutch cut off condition is automatically changed, thereby executing clutch cut off with optimal timing in accordance with the work situation.

(3) The clutch cut off operation stage change-over switch 36 is configured so that release timing can be selected at least between the first stage, in which the forward/reverse clutches 18 and 19 are released with earlier timing, and the second stage, in which the forward/reverse clutches 18 and 19 are released with later timing. When the first stage is set by the clutch cut off operation stage change-over switch 36, if the transmission 3 is detected to have been set to a low speed stage, the controller 10 automatically switches the clutch cut off condition so that the timing of releasing the forward/reverse clutches 18 and 19 becomes later. As a result, while the wheel loader 100 is performing a work in a steep ramp or the like that requires a great drive force, even if the first stage, in which the execution timing of clutch cut off is earlier, has been selected, the clutch cut off condition can be switched so that the execution timing of clutch cut off becomes later. Hence, clutch cut off is executed with optimal timing without operating the clutch cut off operation stage change-over switch 36 performed by the operator.

—Variations—

(1) While in the explanation described above, the brake fluid pressure Plb is considered as a clutch cut off condition, the present invention is not limited to this example. In place of the brake fluid pressure Plb, for example, an operation amount (pedal stroke or pedal angle) of the brake pedal 31 detected by the pedal operation amount detector 31*a* or depression force on the brake pedal 31 detected by a detector that is not shown may be considered as a clutch cut off condition. Namely, a parameter considered as a clutch cut off condition is not limited to the brake fluid pressure Plb as long as the parameter allows an operation state (magnitude of braking force) of the brake to be detected directly or indirectly. Here, also when braking force of industrial vehicle is used as a parameter of clutch cut off condition, similarly to the brake fluid pressure Plb described above, if braking force is equal to or greater than a clutch cut off threshold value that is set in advance to be optimal, the clutch cut off condition is judged to be satisfied.

(2) While in the explanation described above, the clutch cut off condition can be set to any of the first stage to the third stage through an operation of the clutch cut off operation stage change-over switch 36, the present invention is not limited to this example. For instance, it may be arranged that two stages are included as the clutch cut off operation stages and the timing of clutch cut off can be selected from “earlier” and “later”. More specifically, it may be arranged that the clutch cut off operation stages include at least two stages or more and the timing of clutch cut off can be set to at least “earlier” or “later”.

(3) While in the explanation described above, when the clutch cut off operation stage change-over switch 36 is set to the first stage or the third stage, if the set speed stage of the transmission 3 is judged to be the first speed, the clutch cut off condition is automatically switched so that the execution timing of clutch cut off is delayed. However, the present invention is not limited to this example. For example, it may be arranged that when the clutch cut off operation stage change-over switch 36 is set to the second stage, if the set speed stage of the transmission 3 is judged to be other than the first speed, the clutch cut off condition is automatically switched so that the execution timing of clutch cut off is made earlier.

(4) While in the explanation described above, braking force of the wheel loader 100 (the brake fluid pressure Plb, an operation amount of the brake pedal 31, or the like) is used as a clutch cut off condition, the present invention is not limited to this example. For instance, the speed ratio e of the torque converter 2 as well as braking force of the wheel loader 100 may be use as a clutch cut off condition. The speed ratio e is a ratio of the rotation number Nt of the output shaft 22 to the rotation number Ni of the input shaft 21 of the torque converter 2 (=Nt/Ni). More specifically, it may be arranged that when the brake fluid pressure Plb is equal to or greater than a set value and the torque converter speed ratio e is equal to or less than a set value, clutch cut off condition is judged to be satisfied and clutch cut off is executed.

(5) While in the explanation described above, when performing clutch cut off, a cut off signal for cutting off the forward/reverse clutches 18 and 19 is output from the controller 10 to the transmission control device 20, the present invention is not limited to this example. For example, it may be arranged that a cut off signal is output from the controller 10 to the transmission control device 20 so as to cut off only a clutch that is engaged at the time of performing the clutch cut off. More specifically, it may be arranged that when performing clutch cut off while the wheel loader 100 is moving forward, a cut off signal is output from the controller 10 to the transmission control device 20 so as to cut off only the forward clutch 18.

(6) While in the explanation described above, the number of selectable speed stages in the transmission 3 is four stages, the present invention is not limited to this example and it may be three stages or it may be five or more stages. In addition, while in the explanation described above, the explanation was made by giving the wheel loader 100 as an example of an industrial vehicle, the present invention is not limited to this example and other industrial vehicles such as a forklift, a telehandler, or a lift truck may be given as examples.

(7) The embodiments and the variations described above may be combined.

It is to be noted that the present invention is not limited to the example of the embodiment described above, and includes a clutch control device for industrial vehicles with a variety of structures characterized by including a braking force detection device that detects braking force of an industrial vehicle, a speed stage detection device that detects a set speed stage of a transmission, a clutch control device that controls engage/release of a forward clutch so that the forward clutch is released when a clutch cut off condition is judged to be satisfied based upon braking force of the industrial vehicle detected by the braking force detection device, and a switching device that automatically switches the clutch cut off condition in the clutch control device based upon a set speed stage of the transmission detected by the speed stage detection device.

The disclosure of the following priority application is herein incorporated by reference:

Japanese Patent Application No. 2009-283138 (filed Dec. 14, 2009)

The invention claimed is:

1. A clutch control device for an industrial vehicle, comprising:

an engine;

a brake device that applies a brake to the industrial vehicle according to operation of a brake pedal;

a braking force detection device that detects braking force of the industrial vehicle applied by the brake device;

a transmission that includes a forward clutch, a reverse clutch and a plurality of speed change clutches for switching speed stages, and is controlled to shift speed to a set speed stage by engaging one of the forward clutch and the reverse clutch that has been selected and one of the plurality of the speed change clutches that has been selected and to transmit output torque of the engine;

a speed stage detection device that detects the set speed stage of the transmission;

a clutch cut off selection device that selects whether or not to execute a clutch cut off control in which the forward clutch is released with increase in the braking force according to the operation of the brake pedal;

a clutch control device that controls engage/release of the forward clutch if the clutch cut off selection device selects the clutch cut off control to be executed so that the forward clutch is released when one of a plurality of clutch cut off conditions is judged to be satisfied based upon braking force of the industrial vehicle detected by the braking force detection device, with the plurality of clutch cut off conditions being arranged so that with a greater braking force of the industrial vehicle, the forward clutch is released at a later timing; and a switching device that automatically switches among the plurality of clutch cut off conditions in the clutch control device based upon the set speed stage of the transmission detected by the speed stage detection device.

2. A clutch control device for industrial vehicle according to claim 1, wherein:

when the speed stage detection device detects that the transmission has been set to a low speed stage, the switching device automatically switches to a clutch cut off condition in which the forward clutch is released at a later timing with a greater braking force.

3. A clutch control device for industrial vehicle according to claim 2, further comprising:

a timing selection device that can select release timing of the forward clutch at least between a first stage, in which the forward clutch is released at an earlier timing, and a second stage, in which the forward clutch is released at a later timing, wherein:

the switching device automatically switches among the plurality of clutch cut off conditions so that, when the first stage has been selected by the timing selection device, if the transmission is detected to have been set to the low speed stage, timing at which the forward clutch is released becomes later.

4. A clutch control device for industrial vehicle according to claim 3, wherein:

the clutch control device judges that one of the clutch cut off conditions is satisfied when the braking force is equal to or greater than a clutch cut off threshold value.

5. A clutch control device for industrial vehicle according to claim 2, wherein:

the clutch control device judges that one of the clutch cut of conditions is satisfied when the braking force is equal to or greater than a clutch cut off threshold value.

6. A clutch control device for industrial vehicle according to claim 1, wherein:

the clutch control device judges that one of the plurality of clutch cut off conditions is satisfied when the braking force is equal to or greater than a clutch cut off threshold value.

7. A wheel loader, comprising:

an engine;

a brake device that applies a brake to the wheel loader according to operation of a brake pedal;

a braking force detection device that detects braking force of the wheel loader applied by the brake device;

a transmission that includes a forward clutch, a reverse clutch and a plurality of speed change clutches for switching speed stages, and is controlled to shift speed to a set speed stage by engaging one of the forward clutch and the reverse clutch that has been selected and one of the plurality of the speed change clutches that has been selected and to transmit output torque of the engine;

a speed stage detection device that detects the set speed stage of the transmission;

a clutch cut off selection device that selects whether or not to execute a clutch cut off control in which the forward clutch is released with increase in the braking force according to the operation of the brake pedal;

a clutch control device that controls engage/release of the forward clutch if the clutch cut off selection device selects the clutch cut off control to be executed so that the forward clutch is released when one of a plurality of clutch cut off conditions is judged to be satisfied based upon braking force of the wheel loader detected by the braking force detection device, with the plurality of clutch cut off conditions being arranged so that with a greater braking force of the wheel loader, the forward clutch is released at a later timing; and a switching device that automatically switches among the plurality of clutch cut off conditions in the clutch control device based upon the set speed stage of the transmission detected by the speed stage detection device.

* * * * *